United States Patent
Wang et al.

(10) Patent No.: US 11,112,519 B2
(45) Date of Patent: Sep. 7, 2021

(54) AUTOMATIC SLOWNESS-FREQUENCY RANGE DETERMINATION FOR ADVANCED BOREHOLE SONIC DATA PROCESSING

(71) Applicant: HALLIBURTON ENERGY SERVICES, INC., Houston, TX (US)

(72) Inventors: Ruijia Wang, Singapore (SG); Chung Chang, Houston, TX (US); John Philip Granville, Humble, TX (US); Baichun Sun, Perth (AU)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 317 days.

(21) Appl. No.: 16/068,980

(22) PCT Filed: Mar. 28, 2017

(86) PCT No.: PCT/US2017/024590
§ 371 (c)(1),
(2) Date: Jul. 10, 2018

(87) PCT Pub. No.: WO2017/172805
PCT Pub. Date: Oct. 5, 2017

(65) Prior Publication Data
US 2019/0018162 A1    Jan. 17, 2019

Related U.S. Application Data

(60) Provisional application No. 62/317,265, filed on Apr. 1, 2016.

(51) Int. Cl.
*E21B 47/00* (2012.01)
*G01V 1/44* (2006.01)
(Continued)

(52) U.S. Cl.
CPC ............. *G01V 1/50* (2013.01); *E21B 47/14* (2013.01); *G01V 1/44* (2013.01); *G01V 1/46* (2013.01);
(Continued)

(58) Field of Classification Search
CPC .......... E21B 47/14; E21B 49/10; G01V 1/44; G01V 1/46; G01V 1/48; G01V 2210/21;
(Continued)

(56) References Cited

U.S. PATENT DOCUMENTS

| 6,188,961 B1* | 2/2001 | Mandal | G01V 1/50 |
| | | | 702/6 |
| 7,529,152 B2* | 5/2009 | Sinha | G01V 1/50 |
| | | | 367/31 |
| 7,764,572 B2* | 7/2010 | Wu | G01V 1/44 |
| | | | 367/31 |
| 2003/0002388 A1 | 1/2003 | Mandal | |

(Continued)

FOREIGN PATENT DOCUMENTS

WO     2014092687 A1     6/2014

OTHER PUBLICATIONS

International Search Report and Written Opinion; PCT Application No. PCT/US2017/024590; dated Jul. 6, 2017.

*Primary Examiner* — Jeffrey P Aiello
(74) *Attorney, Agent, or Firm* — Polsinelli PC

(57) ABSTRACT

Disclosed are systems and methods for selecting modes and frequencies of interest in a slowness-frequency map of sonic logging information. These include measuring, by a sonic logging tool, sonic data within a borehole, determining a frequency range for a selected mode of the sonic data, determining a slowness range for the selected mode of the sonic data, applying the frequency range and the slowness range to the sonic data to select a subset of data from the sonic data, processing the selected subset of data.

20 Claims, 13 Drawing Sheets

(51) Int. Cl.
*G01V 1/46* (2006.01)
*G01V 1/48* (2006.01)
*G01V 1/50* (2006.01)
*E21B 47/14* (2006.01)

(52) U.S. Cl.
CPC ............ *G01V 1/48* (2013.01); *G01V 2210/21* (2013.01); *G01V 2210/41* (2013.01); *G01V 2210/47* (2013.01); *G01V 2210/626* (2013.01)

(58) Field of Classification Search
CPC ........... G01V 2210/41; G01V 2210/47; G01V 1/306; G01V 11/00; G06F 17/40; G06F 19/00
USPC ......... 73/152.02, 152.51; 166/250.01, 254.2; 175/50; 181/102; 367/25–26, 31, 86; 702/1–2, 6, 9, 11, 13–14, 17–18, 85, 179; 703/10
See application file for complete search history.

(56) References Cited

U.S. PATENT DOCUMENTS

| | | | |
|---|---|---|---|
| 2003/0139884 A1* | 7/2003 | Blanch | G01V 1/48 702/6 |
| 2006/0285439 A1* | 12/2006 | Haugland | G01V 1/48 367/75 |
| 2008/0010021 A1* | 1/2008 | Zheng | G01V 1/50 702/6 |
| 2008/0027650 A1* | 1/2008 | Huang | G01V 1/48 702/13 |
| 2010/0085835 A1* | 4/2010 | Tang | G01V 1/30 367/32 |
| 2010/0250214 A1* | 9/2010 | Prioul | G01V 1/48 703/10 |
| 2011/0019501 A1* | 1/2011 | Market | G01V 1/50 367/34 |
| 2014/0005946 A1* | 1/2014 | Mandal | G01V 1/48 702/17 |
| 2016/0252637 A1* | 9/2016 | Li | G01V 1/303 702/18 |

* cited by examiner

AUTOMATIC SLOWNESS-FREQUENCY RANGE DETERMINATION FOR ADVANCED BOREHOLE SONIC DATA PROCESSING

CROSS-REFERENCE

The present application claims the benefit of U.S. Provisional Application No. 62/317,265, filed Apr. 1, 2016, which is hereby incorporated by reference in its entirety.

TECHNICAL FIELD

The present disclosure pertains to the processing of sonic logging information, and more specifically to techniques for selecting modes and frequencies of interest in the slowness-frequency map of sonic logging information.

BACKGROUND

Sonic logging tools often use different borehole modes to extract the mechanical/petrophysical properties of a formation. Modes are borehole guided wave propagations that are inherently dispersive. Due to the dispersive nature of borehole modes, features of the same mode at different frequencies could be very different. For example, the low-frequency asymptotes of flexural waves in hard formation boreholes are fully controlled by the formation body shear slowness, while their high-frequency counterparts are dominated by the fluid compressional slowness. Multiple wave modes, whether dispersive or not, may get excited in a single source firing. Moreover, these modes may span at different excitation frequencies, and each mode can manifest variant features. Thus, each mode can be extracted individually for inversion and/or processing algorithms having different purposes. For example, low-frequency flexural waves may be used for shear slowness inversion, low-frequency Stoneley waves for vertical transverse isotropic (VTI) inversion, high-frequency Stoneley waves for mud slowness inversion, and the like. Therefore, in advanced acoustic data processing one needs an accurate, stable and efficient method for selecting modes and frequencies of interest in the slowness-frequency map.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1A:
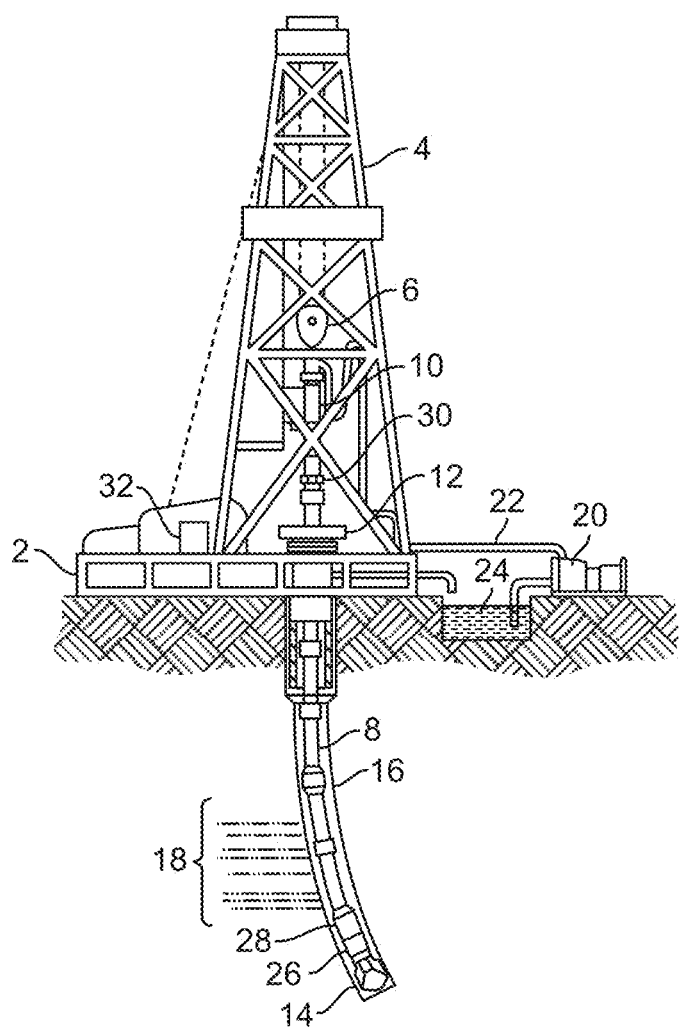
FIG. 1A illustrates a schematic diagram of an example logging-while-drilling (LWD) environment.

Various embodiments of the disclosure are described in detail below. While specific implementations are described, it should be understood that this is done for illustration purposes only. Other components and configurations may be used without parting from the spirit and scope of the disclosure. Moreover, it should be understood that features or configurations herein with reference to one embodiment or example can be implemented in, or combined with, other embodiments or examples herein. That is, terms such as "embodiment", "variation", "aspect", "example", "configuration", "implementation", "case", and any other terms which may connote an embodiment, as used herein to describe specific features or configurations, are not intended to limit any of the associated features or configurations to a specific or separate embodiment or embodiments, and should not be interpreted to suggest that such features or configurations cannot be combined with features or configurations described with reference to other embodiments, variations, aspects, examples, configurations, implementations, cases, and so forth. In other words, features described herein with reference to a specific example (e.g., embodiment, variation, aspect, configuration, implementation, case, etc.) can be combined with features described with reference to another example. Precisely, one of ordinary skill in the art will readily recognize that the various embodiments or examples described herein, and their associated features, can be combined with each other.

Overview

Different modes or different frequency bands of the same mode are associated with different characteristics of the rock formation or the borehole fluid. For instance, shear slowness is often a desirable, and may be extracted, or "picked," from a flexural wave mode. Many borehole guided waves are dispersive, including the flexural waves excited by a dipole source and the leaky-P mode in a soft formation excited by either a monopole or dipole source. Advanced borehole sonic data processing requires to separate these modes and frequency bands. For example, an algorithm for formation shear slowness picking from flexural waves needs to use the low-frequency band of the flexural mode spanning between $f_{min}$ and $f_{max}$. This low-frequency band is difficult for a user to choose manually as there may be multiple modes and the correct mode may not be obvious. Further, the maximum frequency ($f_{max}$) of the low-frequency band can vary due to different types of formations and borehole size, and certain low-frequency flexural waves that may likely be contaminated by noise or coupled to Stoneley modes due to the complexity of the borehole, needs to be discarded in the processing by a proper selection of the minimum frequency ($f_{min}$) of the processing band. Thus, an automatic slowness-frequency processing range determination method can allow for the identification and selection of the target mode at its desired frequencies.

The present disclosure provides for an innovative and reliable method for automatically determining a slowness-frequency processing band. As described in more detail further below, information from earlier obtained sonic logging data may be used to model a response of a target borehole mode and determine slowness and frequency ranges. For instance, initial information, such as a compressional slowness value (DTC), may be used to forward model a dispersion response from which a frequency range may be determined. A slowness range may also be estimated based on this initial information by fundamental physics relationships or other relations. With these determined slowness and frequency ranges, the desired borehole mode (such as a flexural wave) can be fitted and analyzed for further processing. Such further processing may for instance involve a picking function, where particular modes or aspects of the wave data may be determined, such as extracting a shear slowness from the fitted flexural waves. Although flexural and shear slowness are mentioned as exemplary, the disclosed techniques can be used in processing a variety of the borehole modes including, for example, Stoneley waves, flexural waves, leaky-P waves, and screw waves. The proposed techniques can also be used in a variety of processing applications, such as VTI inversion, shear slowness picking, and compressional slowness picking. Furthermore, the present disclosure can be applied using frequency-domain methods, or, with properly designed 1D or 2D f-k filter, using time-domain methods as well. The process enables automatic determination of the desired borehole modes.

DESCRIPTION

The disclosure now turns to FIGS. 1A-B and 2A-B to provide a brief introductory description of the larger systems and computing devices which can be employed to practice the concepts, methods, and techniques disclosed herein. A more detailed description of the presently disclosed automatic slowness-frequency range determination for advanced borehole sonic data processing will then follow.

FIG. 1A shows an illustrative logging while drilling (LWD) environment. A drilling platform 2 supports a derrick 4 having a traveling block 6 for raising and lowering a drill string 8. A kelly 10 supports drill string 8 as it is lowered through a rotary table 12. A drill bit 14 is driven by a downhole motor and/or rotation of drill string 8. As bit 14 rotates, it creates a borehole 16 that passes through various formations 18. A pump 20 circulates drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole into pit 24 and aids in maintaining the borehole integrity.

A downhole tool 26, such as a sonic logging tool, can be integrated into the bottom-hole assembly near bit 14. As the bit extends the borehole through the formations, the bottom-hole assembly collects sonic logging data. Tool 26 may take the form of a drill collar (i.e., a thick-walled tubular that provides weight and rigidity to aid the drilling process) or other arrangements known in the art. Further, downhole tool 26 may include acoustic (e.g., sonic, ultrasonic, etc.) logging tools and/or corresponding components, integrated into the bottom-hole assembly near bit 14. In this fashion, as bit 14 extends the borehole through formations, the bottom-hole assembly (e.g., the acoustic logging tool) can collect acoustic logging data. For example, acoustic logging tools can include transmitters (e.g., monopole, dipole, quadrupole, etc.) to generate and transmit acoustic signals/waves into the borehole environment. These acoustic signals subsequently propagate in and along the borehole and surrounding formation and create acoustic signal responses or waveforms, which are received/recorded by evenly spaced receivers. These receivers may be arranged in an array and may be evenly spaced apart to facilitate capturing and processing acoustic response signals at specific intervals. The acoustic response signals are further analyzed to determine borehole and adjacent formation properties and/or characteristics.

For purposes of communication, a downhole telemetry sub 28 can be included in the bottom-hole assembly to transfer measurement data to a surface receiver 30 and to receive commands from the surface. Mud pulse telemetry is one common telemetry technique for transferring tool measurements to surface receivers and receiving commands from the surface, but other telemetry techniques can also be used. In some embodiments, telemetry sub 28 can store logging data for later retrieval at the surface when the logging assembly is recovered.

At the surface, surface receiver 30 can receive the uplink signal from the downhole telemetry sub 28 and can communicate the signal to a data acquisition module 32. Module 32 can include one or more processors, storage mediums, input devices, output devices, software, and the like as described in detail in FIGS. 2A and 2B. Module 32 can collect, store, and/or process the data received from tool 26 as described herein.

Figure 1B:
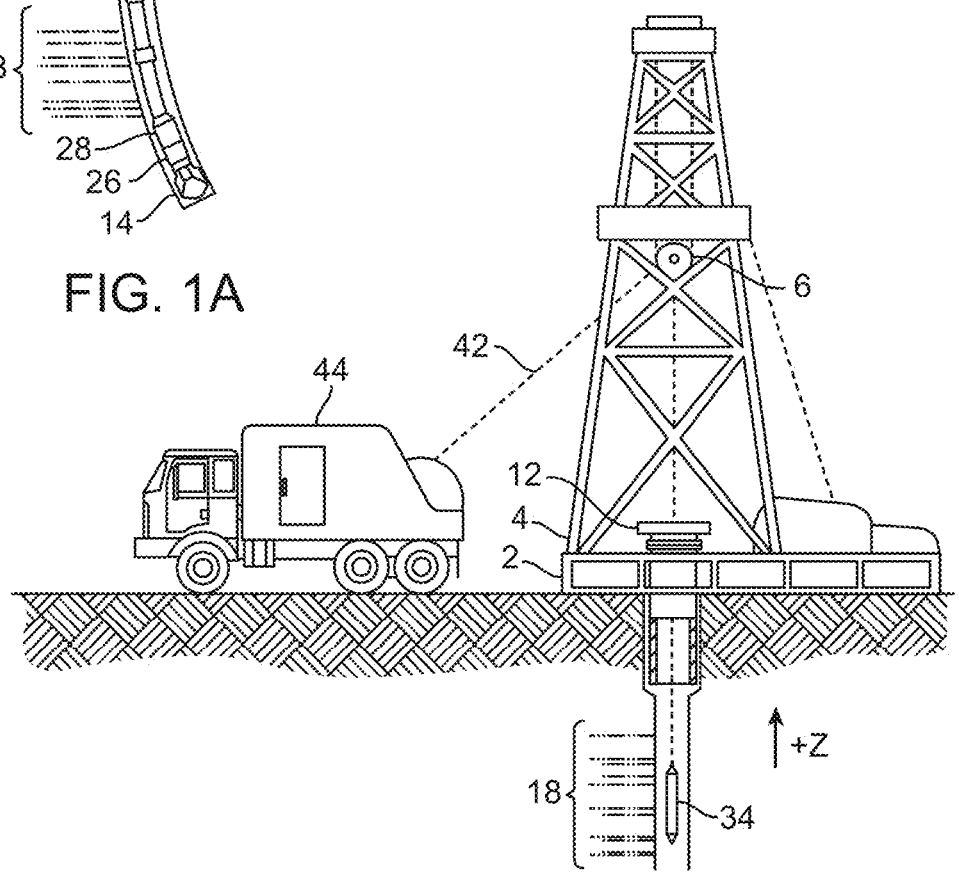
FIG. 1B illustrates a schematic diagram of an example wireline logging environment.

At various times during the drilling process, the drill string 8 may be removed from the borehole as shown in FIG. 1B. Once drill string 8 has been removed, logging operations can be conducted using a downhole tool 34 (i.e., a sensing instrument sonde) suspended by a conveyance 42. In one or more embodiments, the conveyance 42 can be a cable having conductors for transporting power to the tool and telemetry from the tool to the surface. Downhole tool 34 may have pads and/or centralizing springs to maintain the tool near the central axis of the borehole or to bias the tool towards the borehole wall as the tool is moved downhole or uphole.

Downhole tool 34 can include an acoustic or sonic logging instrument that collects acoustic logging data within the borehole 16. A logging facility 44 includes a computer system, such as those described with reference to FIGS. 2A and 2B, for collecting, storing, and/or processing the measurements gathered by logging tool 34. In one or more embodiments, the conveyance 42 of the downhole tool 34 may be at least one of wires, conductive or non-conductive cable (e.g., slickline, etc.), as well as tubular conveyances, such as coiled tubing, pipe string, or downhole tractor. The downhole tool 34 may have a local power supply, such as batteries, downhole generator and the like. When employing non-conductive cable, coiled tubing, pipe string, or downhole tractor, communication may be supported using, for example, wireless protocols (e.g. EM, acoustic, etc.), and/or measurements and logging data may be stored in local memory for subsequent retrieval.

Although FIGS. 1A and 1B depict specific borehole configurations, it should be understood that the present disclosure is equally well suited for use in wellbores having other orientations including vertical wellbores, horizontal wellbores, slanted wellbores, multilateral wellbores and the like. While FIGS. 1A and 1B depict an onshore operation, it should also be understood that the present disclosure is equally well suited for use in offshore operations. Moreover, the present disclosure is not limited to the environments depicted in FIGS. 1A and 1B, and can also be used, for example, in other well operations such as production tubing operations, jointed tubing operations, coiled tubing operations, combinations thereof, and the like.

Figure 2A:
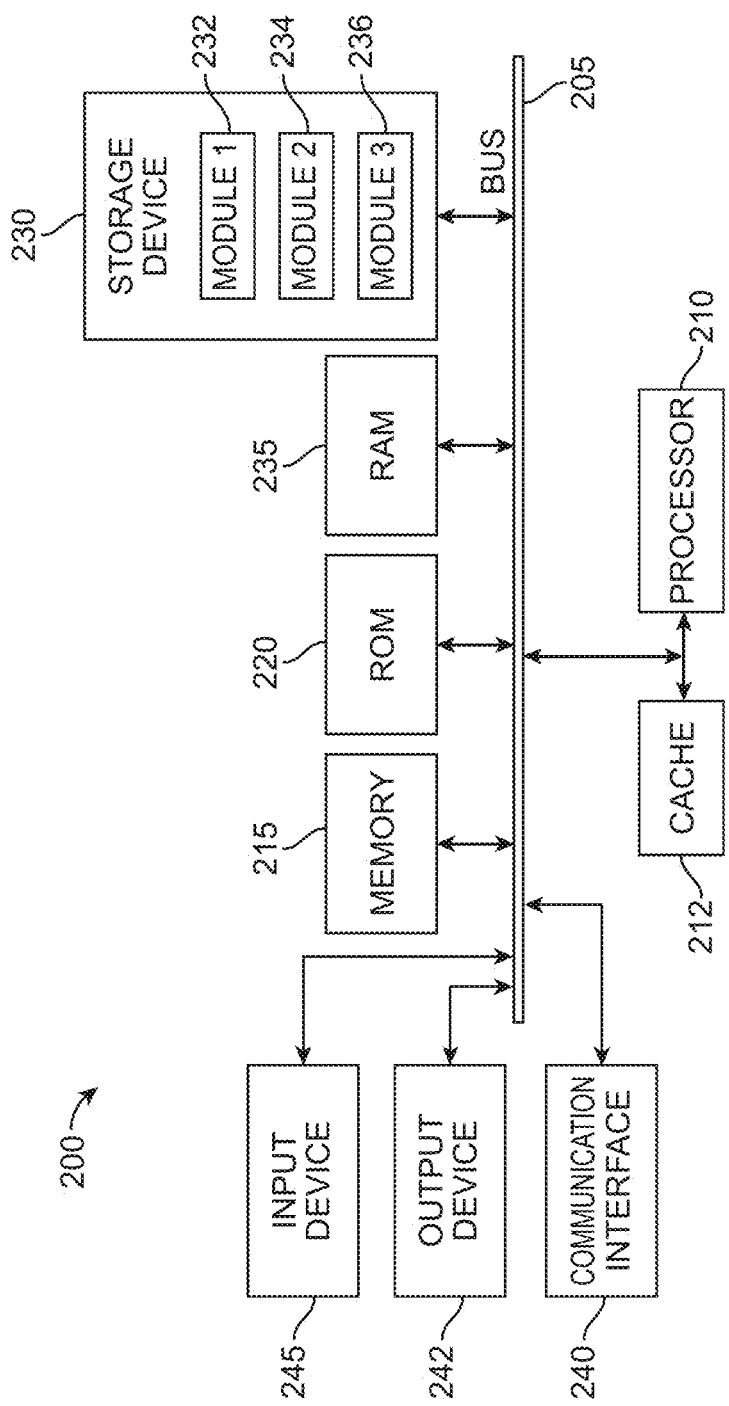
FIGS. 2A and 2B illustrate schematic diagrams of example system embodiments.
Figure 2B:
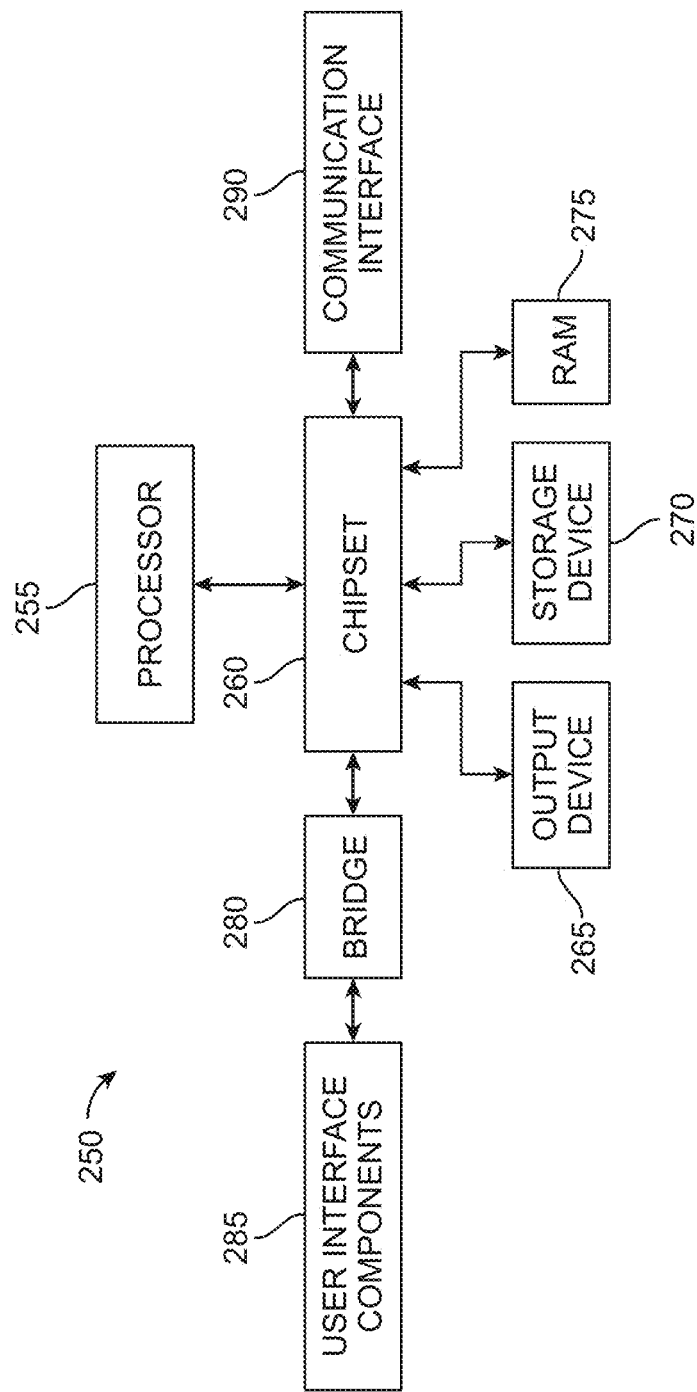

FIG. 2A and FIG. 2B illustrate exemplary computing systems for use with example tools and systems (e.g., downhole tool 26, downhole tool 34, surface equipment, and the like). The more appropriate embodiment will be apparent to those of ordinary skill in the art when practicing the present technology. Persons of ordinary skill in the art will also readily appreciate that other system embodiments are possible.

FIG. 2A illustrates a conventional system bus computing system architecture 200 wherein the components of the system are in electrical communication with each other using a bus 205. System 200 can include a processing unit (CPU or processor) 210 and a system bus 205 that couples various system components including the system memory 215, such as read only memory (ROM) 220 and random access memory (RAM) 235, to the processor 210. The system 200 can include a cache of high-speed memory connected directly with, in close proximity to, or integrated as part of the processor 210. The system 200 can copy data from the memory 215 and/or the storage device 230 to the cache 212 for quick access by the processor 210. In this way, the cache can provide a performance boost that avoids processor 210 delays while waiting for data. These and other modules can control or be configured to control the processor 210 to perform various actions. Other system memory 215 may be available for use as well. The memory 215 can include multiple different types of memory with different performance characteristics. The processor 210 can include any general purpose processor and a hardware module or software module, such as module 1 (232), module 2 (234), and module 3 (236) stored in storage device 230, configured to control the processor 210 as well as a special-purpose processor where software instructions are incorporated into the actual processor design. The processor 210 may essentially be a completely self-contained computing system, containing multiple cores or processors, a bus, memory controller, cache, etc. A multi-core processor may be symmetric or asymmetric.

To enable user interaction with the computing device 200, an input device 245 can represent any number of input mechanisms, such as a microphone for speech, a touch-sensitive screen for gesture or graphical input, keyboard, mouse, motion input, speech and so forth. An output device 242 can also be one or more of a number of output mechanisms known to those of skill in the art. In some instances, multimodal systems can enable a user to provide multiple types of input to communicate with the computing device 200. The communications interface 240 can generally govern and manage the user input and system output. There is no restriction on operating on any particular hardware arrangement and therefore the basic features here may easily be substituted for improved hardware or firmware arrangements as they are developed.

Storage device 230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 235, read only memory (ROM) 220, and hybrids thereof.

The storage device 230 can include software modules 232, 234, 236 for controlling the processor 210. Other hardware or software modules are contemplated. The storage device 230 can be connected to the system bus 205. In one aspect, a hardware module that performs a particular function can include the software component stored in a computer-readable medium in connection with the necessary hardware components, such as the processor 210, bus 205, output device 242, and so forth, to carry out the function.

FIG. 2B illustrates an example computer system 250 having a chipset architecture that can be used in executing the described method and generating and displaying a graphical user interface (GUI). Computer system 250 can be computer hardware, software, and firmware that can be used to implement the disclosed technology. System 250 can include a processor 255, representative of any number of physically and/or logically distinct resources capable of executing software, firmware, and hardware configured to perform identified computations. Processor 255 can communicate with a chipset 260 that can control input to and output from processor 255. Chipset 260 can output information to output device 265, such as a display, and can read and write information to storage device 270, which can include magnetic media, and solid state media. Chipset 260 can also read data from and write data to RAM 275. A bridge 280 for interfacing with a variety of user interface components 285 can be provided for interfacing with chipset 260. Such user interface components 285 can include a keyboard, a microphone, touch detection and processing circuitry, a pointing device, such as a mouse, and so on. In general, inputs to system 250 can come from any of a variety of sources, machine generated and/or human generated.

Chipset 260 can also interface with one or more communication interfaces 290 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 255 analyzing data stored in storage 270 or 275. Further, the machine can receive inputs from a user via user interface components 285 and execute appropriate functions, such as browsing functions by interpreting these inputs using processor 255.

It can be appreciated that systems 200 and 250 can have more than one processor 210 or be part of a group or cluster of computing devices networked together to provide greater processing capability.

Several acoustic guided waves are typically generated in a fluid-filled borehole. For example, in fast formations, a monopole source may excite the refracted P- and S-waves, pseudo-Rayleigh waves of different orders, and Stoneley waves. In a slow formation, the monopole source may generate refracted P-wave, leaky-P-wave, and Stoneley waves. A dipole source in a fast formation may excite the refracted P- and S-waves, as well as flexural waves of different orders. Further, a dipole source in a slow formation may excite leaky-P and flexural waves. In addition, a quadrupole source may excite the refracted P- and S-waves, as well as screw waves. The various modes referenced above may interfere with each other in complicated borehole environments where, for example, the tool is off centered or the formation is highly heterogeneous. Therefore, it becomes a nontrivial effort to accurately separate and identify the mode(s) of interest.

In addition, because the frequency sensitivity of each mode to borehole parameters is different, it is better to process the mode at discrete frequency bands of interest. Those frequencies outside the range of interest should not be included in the processing since their unrelated data may increase the uncertainty of the processing results. As previously discussed, manual dispersion data or frequency selections can be a challenging issue because the frequency parameters can vary for different types of formations. With this in mind, it becomes a nearly impossible task to manually set the frequency cutoffs during real-time operations which require minimal human interaction. This lack of human interaction in processing may lead to extremely unstable results, for example, the algorithm can track the wrong modes or jump between different modes. Therefore, it is challenging to accurately evaluate the slowness-frequency processing range automatically during real time processing when human interactions are not feasible and the computing time is limited between different transmitter firings.

Figure 3:
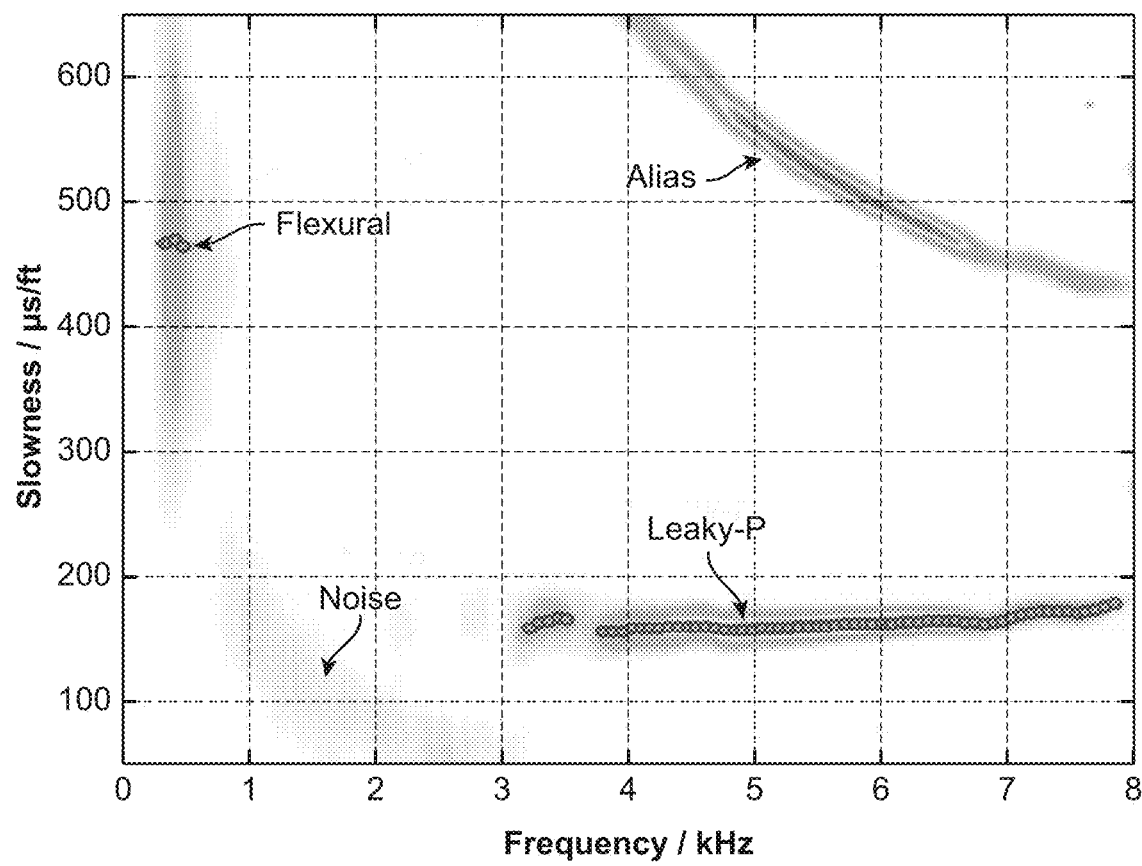
FIG. 3 is a graphical representation of an example slowness vs. frequency coherence map.

FIG. 3 illustrates a 2D semblance map for a dipole source firing in a fluid-filled borehole surrounded by a soft formation. Such a map can be a differential phase frequency semblance or coherence map having multiple slowness values for each frequency. As illustrated, multiple peaks, each corresponding to different modes or noise, are present in the slowness-frequency semblance map, including the dipole leaky-P waves, the alias of dipole leaky-P waves, flexural waves, and the noise. In dipole data processing, generally only the low-frequency flexural waves are preferred. However, FIG. 3 shows that the leaky-P waves and its alias have much higher coherence levels than that of flexural waves. Without a reliable slowness-frequency window determination method, there is a high probability that the slowness picking may jump to leaky-P waves or noise waves when using a typical dipole processing algorithm, rather than the desired low-frequency flexural waves. In other words, accurately determining and constraining the slowness-frequency window is essential for advanced sonic data processing as it helps locate the correct modes and their frequencies.

In general, the approaches set forth herein utilize prior information from the sonic data and a forward modeling method to establish proper constraints in order to process dipole sonic data efficiently and accurately. Such an approach requires that the prior information be reliable and stable, and that the method of converting the prior information to slowness-frequency range be practical and simple. In the context of the present disclosure, the prior information from the sonic data includes the formation compressional slowness value (DTC) and the amplitude spectrum of target waveforms. Modern acoustic logging tools are able to extract the DTC from monopole high-frequency firing for any type of formation. Therefore, the DTC provides a reliable constraint. The amplitude spectra information can also be considered as an important quality control (QC) measure for the wave modes themselves. Thus, it is practical and effective to use the spectral amplitude to monitor the quality of the waveforms and further determine the slowness-frequency range.

Figure 4:
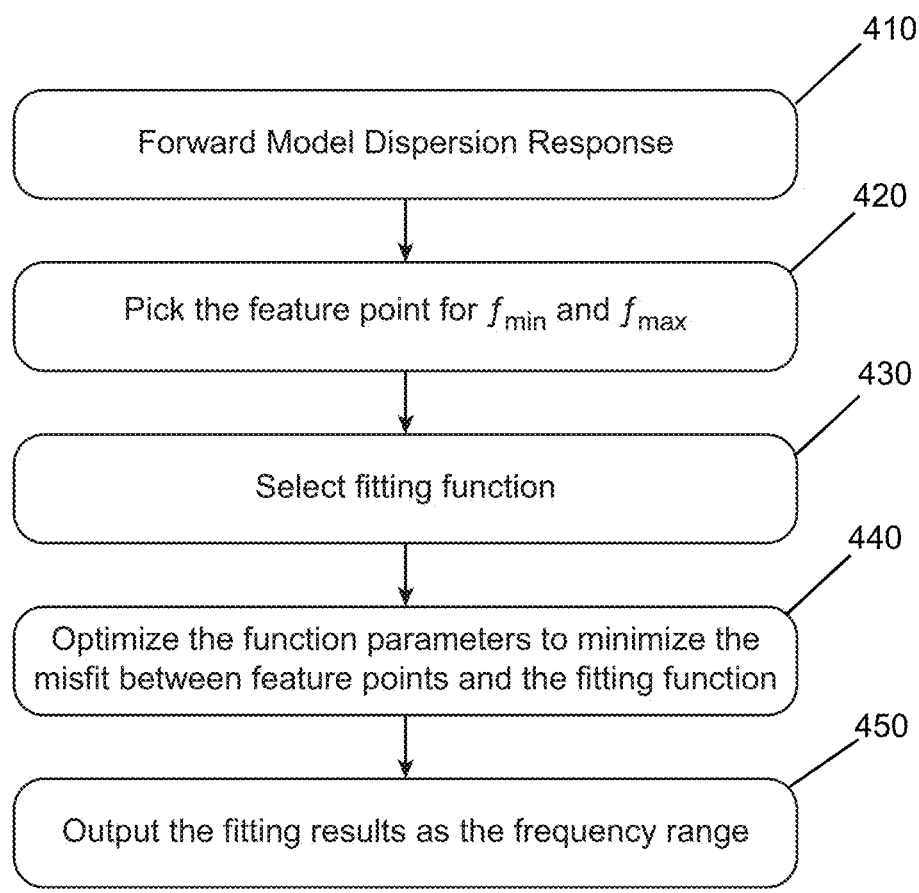
FIG. 4 illustrates an exemplary process workflow for determining a frequency range.

The following discussion can be divided into two tasks: (1) determining the frequency range and (2) determining the slowness range. These can be determined based on information contained in earlier sonic data, such as DTC. A general work flow 400 to determine the frequency processing band from a known DTC is illustrated in FIG. 4. For ease of explanation, in the discussion hereinafter $s_{min}$ and $s_{max}$ are used to represent slowness minimum and maximum, respectively, and $f_{min}$ and $f_{max}$ are used to represent frequency minimum and maximum, respectively.

Referring to FIG. 4 for the determination of a frequency range, first, as shown in step 410, a forward model is run to obtain the dispersion response of the target mode with different formation DTC values (DTC values for a number of different formations). This can be developed based on a modeled relationship between shear slowness values and DTC values, whereby a plot of slowness versus frequency (i.e., a dispersion response) may be generated. Second, as shown in step 420, the end points of $f_{min}$ and $f_{max}$ are selected by applying the rules of a real processing method. After these first two steps, as shown in step 430 a fitting function is selected to fit between the end point for $f_{min}$ and $f_{max}$, respectively. This fit may be subject to an optimization step to minimize the misfit between desired feature points and the fitting function as shown in step 440. Finally, as shown in step 450, the fitting results between $f_{min}$ and $f_{max}$ are obtained and are subsequently used to generate an initial frequency band for the next processing step.

Figure 5:
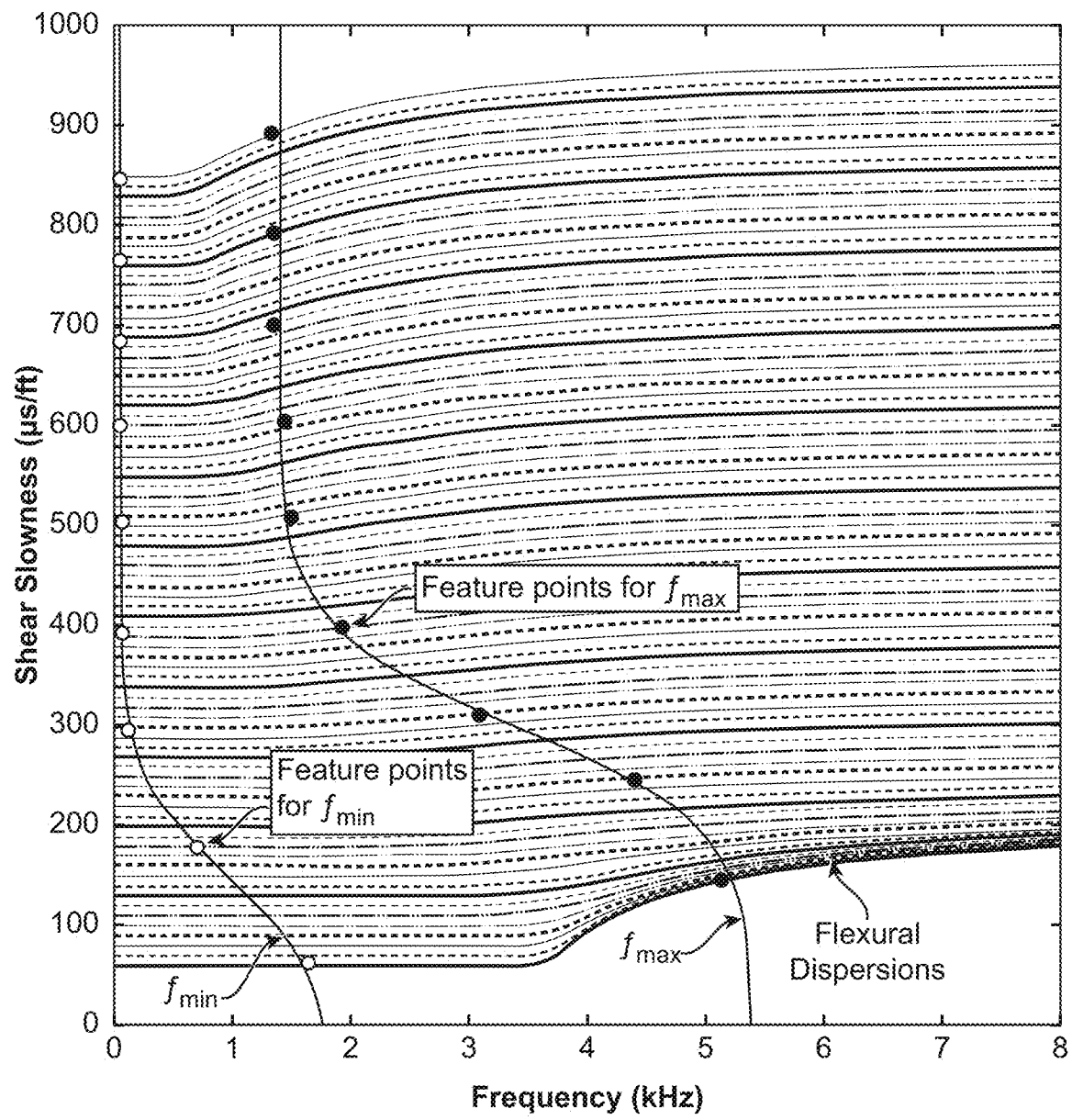
FIG. 5 is a graphical representation of an example of generating functions to connect the compressional slowness value(s) and the frequency band for dipole shear slowness picking.

Accordingly, the initial steps involve obtaining a dispersion response of a target mode. FIG. 5 illustrates a dispersion response with an example of a frequency range generated for shear slowness picking of flexural waves. During the initial processing steps, a forward model is used to generate the relationship between DTC and actual flexural dispersion response. In the forward modeling procedure, the relationship shown in equation (1) below can be assumed, where DTS is the expected shear slowness in the forward modeling.

$$DTS=a*DTC \quad (1)$$

The value of a can be chosen based on past processing data or experience. For example, in some cases a can be chosen to be 2. The value of a, as well as other parameters, can be chosen from standard borehole parameters, and may be based on obtained data or logging information regarding the target borehole, history of the target borehole, similar boreholes, or past experience.

After generating a relationship between DTC and the actual flexural dispersion response, the dispersion response of flexural waves for various types of formations can be plotted. For example, FIG. 5 shows the dispersion response for various formations within a borehole having a diameter of 20 cm. As would be understood, FIG. 5 is exemplary and thus other formations and borehole diameters may be employed, such as for example 5 to 30 cm, alternatively, 10 to 25 cm and alternatively 15-20 cm. The next step is to choose the end points of $f_{min}$ and $f_{max}$.

The shear slowness picking processing algorithm (discussed below) requires that the frequency range covers the frequencies near the cut-off frequency (i.e., the frequency at which the dispersion curve of the flexural wave starts to be distinguished from formation shear slowness). The flexural signals at the frequencies slightly lower than the cut-off frequency provides the slowness reading which is very close to the true shear slowness, while the flexural signals at the frequencies slightly higher than the cut-off frequency provide energetic signals. Taking full advantage of the entire signal spectrum makes the shear slowness picking algorithm stable and accurate. Following the rules described above, the end points in the dispersion response are picked as shown by the round dots in FIG. 5.

From here, a fitting function for $f_{min}$ and $f_{max}$ is selected using equation (2) below, where $b_{1-4}$ are fitting parameters. More specifically, $b_1$ represents the frequency boundary for the very fast formation, while $(b_1-2b_2)$ represent the frequency boundary for the very slow formation, and $b_3$ and $b_4$ represent the changing rate and the position of the transition zone.

$$f_*(DTC) = b_1 - b_2\{\tan h[b_3(2DTC - b_4)] + 1\} \quad (2)$$

Solving for the fitting parameters in FIG. 5 results in:

$$f_{min}(DTC) = 1850 - 900*\{\tan h[0.01*(2DTC - 150)] + 1\} \quad (3)$$

$$f_{max}(DTC) = 5400 - 2000*\{\tan h[0.01*(2DTC - 300)] + 1\} \quad (4)$$

Fitting functions (3) and (4) are displayed in FIG. 5 as well. It can be seen that the functions capture the frequencies near the cut-off frequency.

For boreholes of different size, it may be necessary to rerun the process described in FIG. 4 and generate different functions. However, it is possible to extend equation (3) and (4) to all borehole sizes through equation (5) below, where $D_0$ is the specific borehole size, D is an arbitrary borehole size of interest, and c is an empirical adjustable parameter $$f_*(DTC, D) = f_*(DTC, D_0) * \frac{D + c}{D_0 + c} \quad (5)$$

Additionally, in the forward modeling part of this approach, it is possible to account for the tool effects with an equivalent tool model (ETM).

For practical application, $f_{min}$ and $f_{max}$ can be further adjusted by the amplitude information of the array waveforms data. For example, for the algorithm of shear slowness picking from flexural waves, $f_{max}$ can be further optimized by comparing it to the center frequency of the waveforms using equation (6) below, where $f_0$ represents the waveform center frequency and $f_{max}'$ represents the new optimized frequency upper limit.

$$f_{max}' = \min(f_{max}, f_0) \quad (6)$$

After obtaining the frequency range, next, the slowness range may be determined by generating the $s_{min}$ and $s_{max}$. In some cases, the same procedure for determining the frequency range can be used to decide upon the slowness range of the computing function. However, it is not necessary to repeat the entire procedure, as the possible slowness range can be determined by several equations based on the fundamental physics. For example, for shear slowness picking, the slowness range can be obtained from DTC through equations (7) and (8) based on the fact that the DTC-DTS ratio should be in a reasonable range for typical rock formations.

$$s_{min} = 1.3 * DTC \quad (7)$$

$$s_{max} = 8.0 * DTC \quad (8)$$

Figure 6:
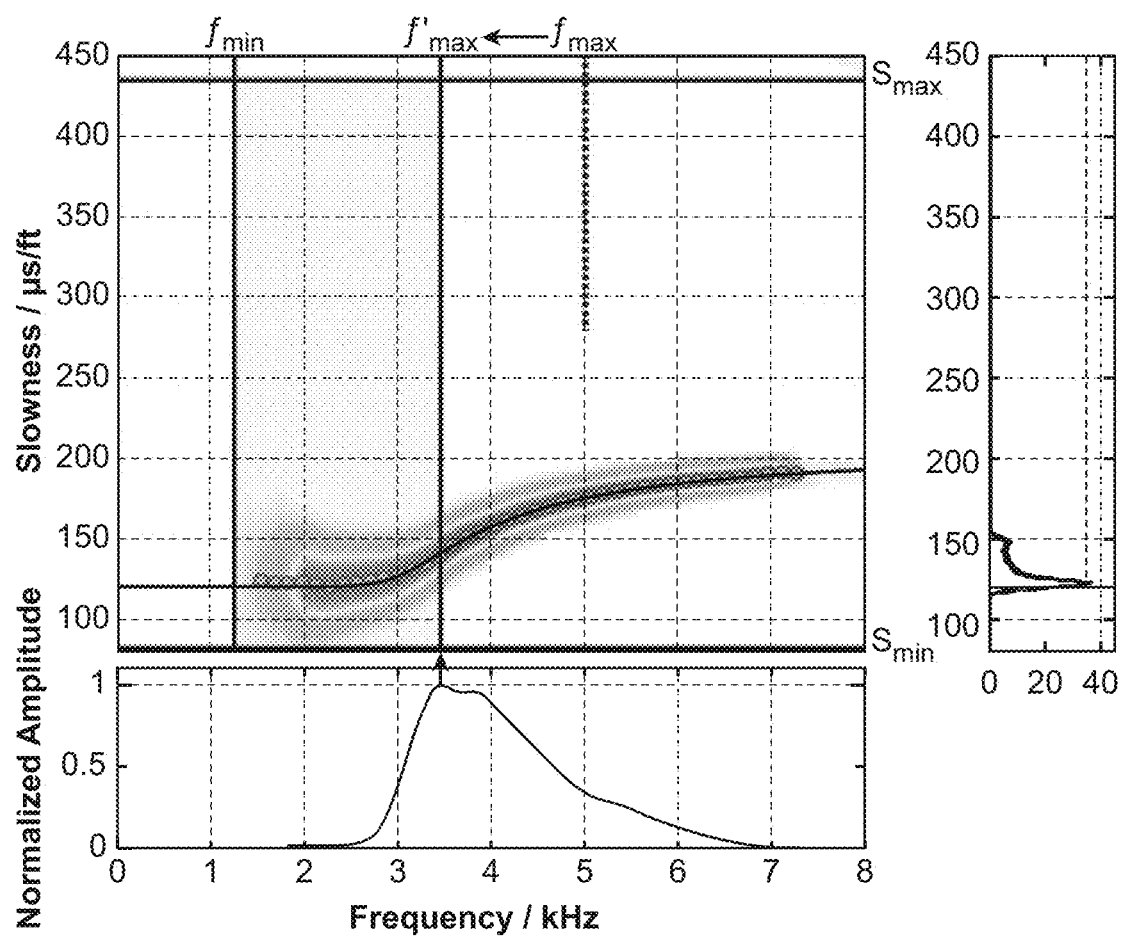
FIG. 6 is a graphical representation of an example of slowness-frequency determination in a hard formation.

FIG. 6 illustrates the flexural wave's slowness-frequency range determination in a hard formation where the input DTC is 55 us/ft. While the example uses 55 us/ft, it will be understood that the DTC may be based on real data obtained from sonic logging. Accordingly, the DTC may differ and may be any number, and may for instance range from 30 to 210 us/ft, from 40 to 170 us/ft, or alternatively from 50 to 100 us/ft, depending on the material, formation, or other downhole factors. Referring back to the example of FIG. 6, it can be seen that $s_{min}$ and $s_{max}$ capture the flexural waves of interest. The initial $f_{min}$ and $f_{max}$ cover a relatively large frequency range, which is expected because the initial range is designed to include all possible, reasonable scenarios. Accordingly, an optimization step may be applied. As illustrated in FIG. 6, the optimized frequency maximum, $f_{max}'$, is calculated using the center frequency of the waveforms and removes some processing risks due to unnecessary higher frequency information. The determined slowness-frequency range bounded by $s_{min}$, $s_{max}$, and $f_{max}'$ is filled with a light shading. It can be seen from FIG. 6 that the range is well selected as it includes the necessary data for the shear slowness picking algorithm.

After fitting and optimizing the flexural wave of interest, this focuses and selects a particular subset of the sonic data to facilitate further processing. For instance this further processing can include a picking function, such as shear slowness picking. The right side plot in FIG. 6 shows a slowness-density histogram for the slowness response inside the determined slowness-frequency range. In general, it is expected that the shear slowness should be picked at the leading edge of the histogram's first local maximum. It can be seen that after applying the new slowness-frequency range, only a single dominant peak exists in the histogram which makes the slowness pick procedure easier and more stable.

Figure 7:
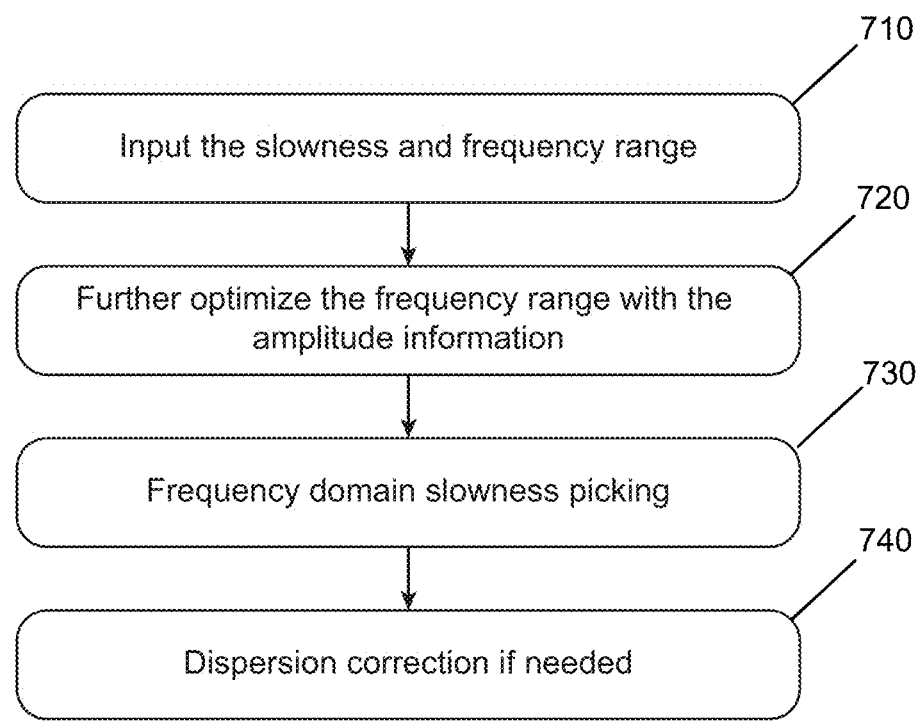
FIG. 7 illustrates an exemplary process workflow for incorporation of the frequency range determination with frequency-domain based methods.

The disclosure now turns to FIG. 7 which shows a workflow 700 for applying the slowness-frequency range results to a frequency-domain based processing/inversion method. First, at step 710, the slowness and frequency range determined by the previous equations (e.g., equations 3-4 and 7-8) are input into the process. This accordingly selects and fits the analysis to a subset of the sonic data which is desirable for processing and later extraction of desired modes and wave information. Next, at step 720, the frequency range is further optimized based on the amplitude information associated with the target waveforms. For example, the waveform center frequency can be used to further optimize the upper frequency limit $f_{max}$. From here, at step 730, a general inversion is run with the data inside the restricted range. This may include for instance a shear slowness picking from inside the restricted frequency range. Finally, at step 740, a dispersion may be applied to correct the procedure if it is required by the algorithm.

Figure 8B:
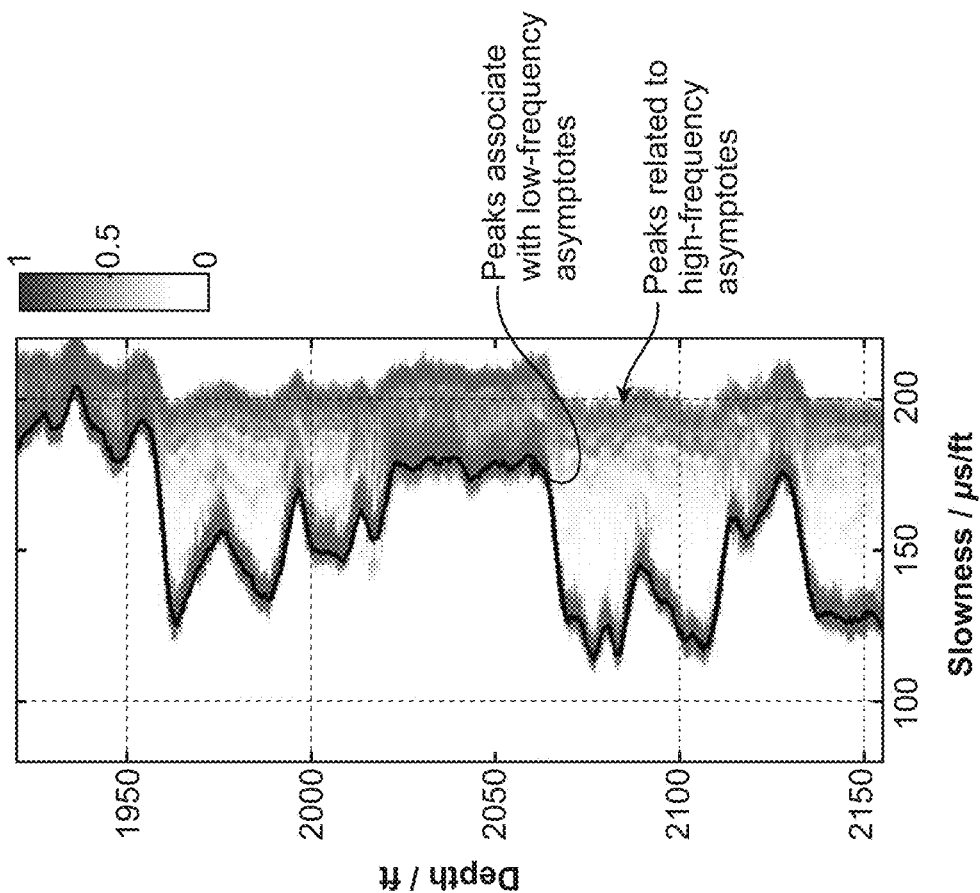
FIGS. 8A and 8B illustrate slowness-density variable density logs (VDL) showing example slowness picking from dipole flexural waves in a hard formation.
Figure 8A:
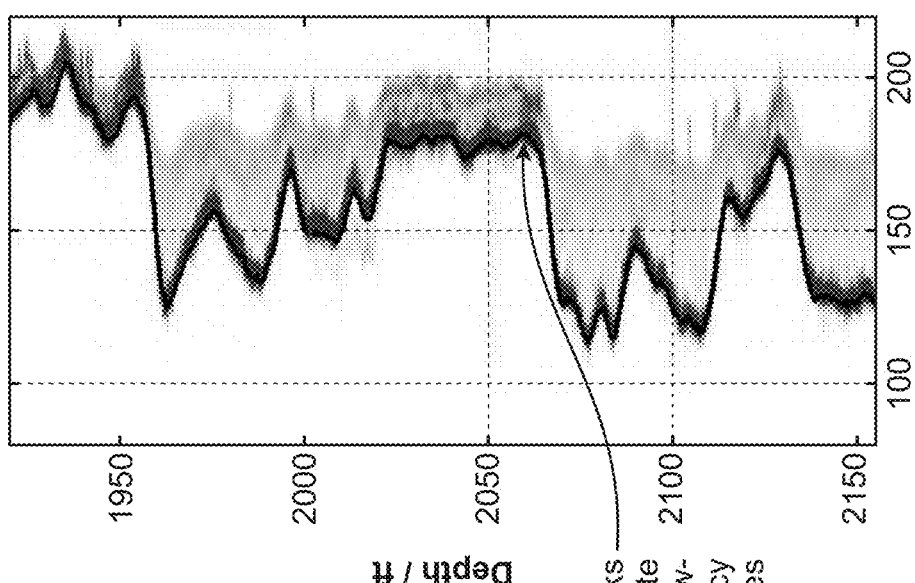

FIGS. 8A and 8B illustrate an example of slowness picking from dipole flexural waves in a hard formation based on the above-described process, where FIG. 8A shows the slowness-density variable density log (VDL) of the data using the slowness-dispersion range determined by the present disclosure, and FIG. 8B shows the slowness-density VDL of using all available data. In the VDL map of all data (i.e., FIG. 8B), there are two distinguishable sets of peaks: one tracking the low frequency arrivals on the left, and one tracking the high-frequency arrivals on the right. For dipole flexural wave processing, the low frequency peaks are desired, whereas the presence of high-frequency peaks may jeopardize the processing results because the algorithm may wrongly pick the high-frequency energy. The presently disclosed techniques remove the peaks associated with the high-frequency asymptotes, as shown in FIG. 8A, which makes the slowness picking easier and more reliable.

Figure 9B:
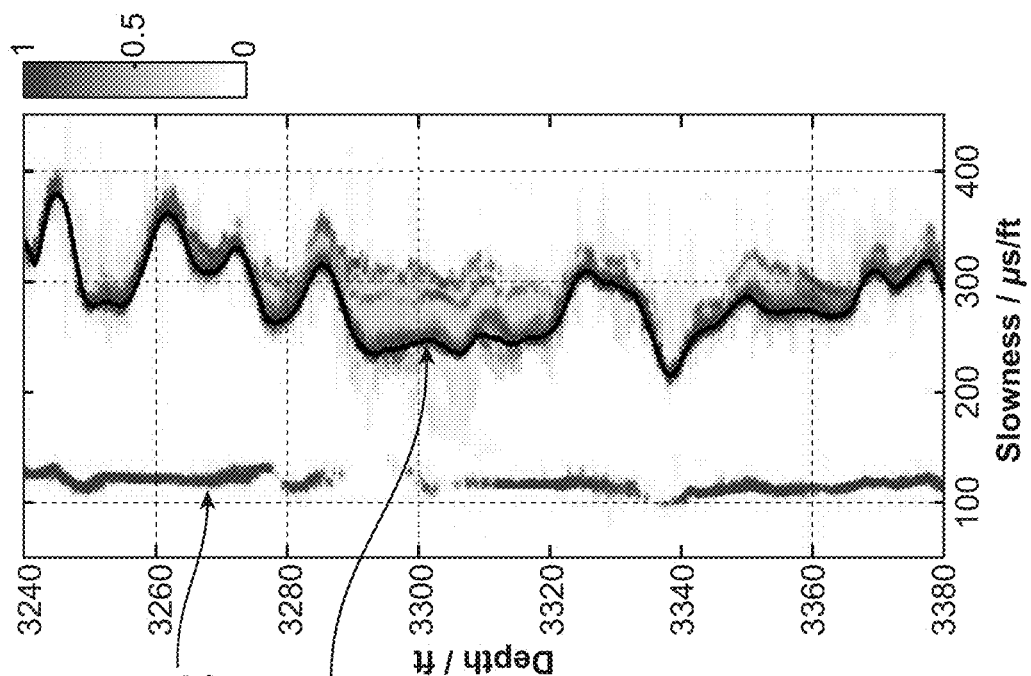
FIGS. 9A and 9B illustrate slowness-density VDL showing example slowness picking from dipole flexural waves in a soft formation.
Figure 9A:
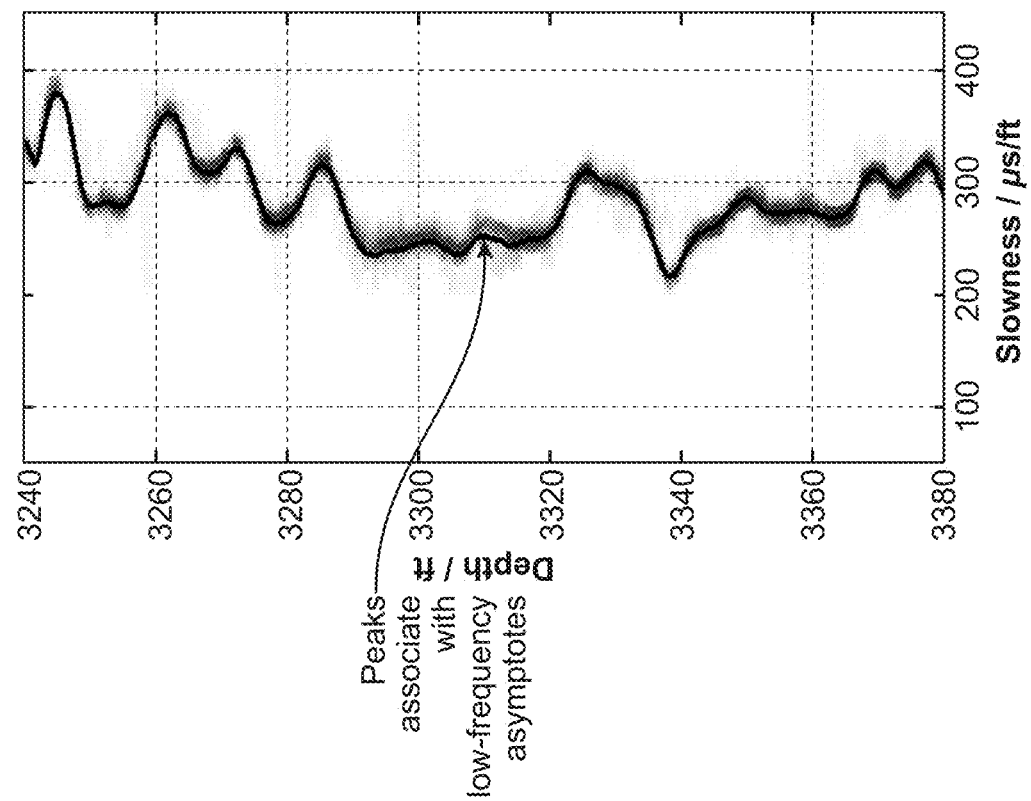

The presently described techniques are also able to remove the influence of leaky-P waves in shear slowness picking from dipole measurements. For example, FIGS. 9A and 9B illustrate a field data example in a soft formation, where FIG. 9A shows the slowness-density VDL of the processed data with the slowness-dispersion range determined by the present disclosure, and FIG. 9B shows the slowness-density VDL of using all available data. In the VDL map of all data (i.e., FIG. 9B), the strong leaky-P peaks exist in the VDL which may be wrongly picked by the peak selection algorithm due to their high coherence values. The presently disclosed techniques remove the leaky-P related peaks, shown in FIG. 9A, making the slowness picking easier and more reliable.

Figure 10:
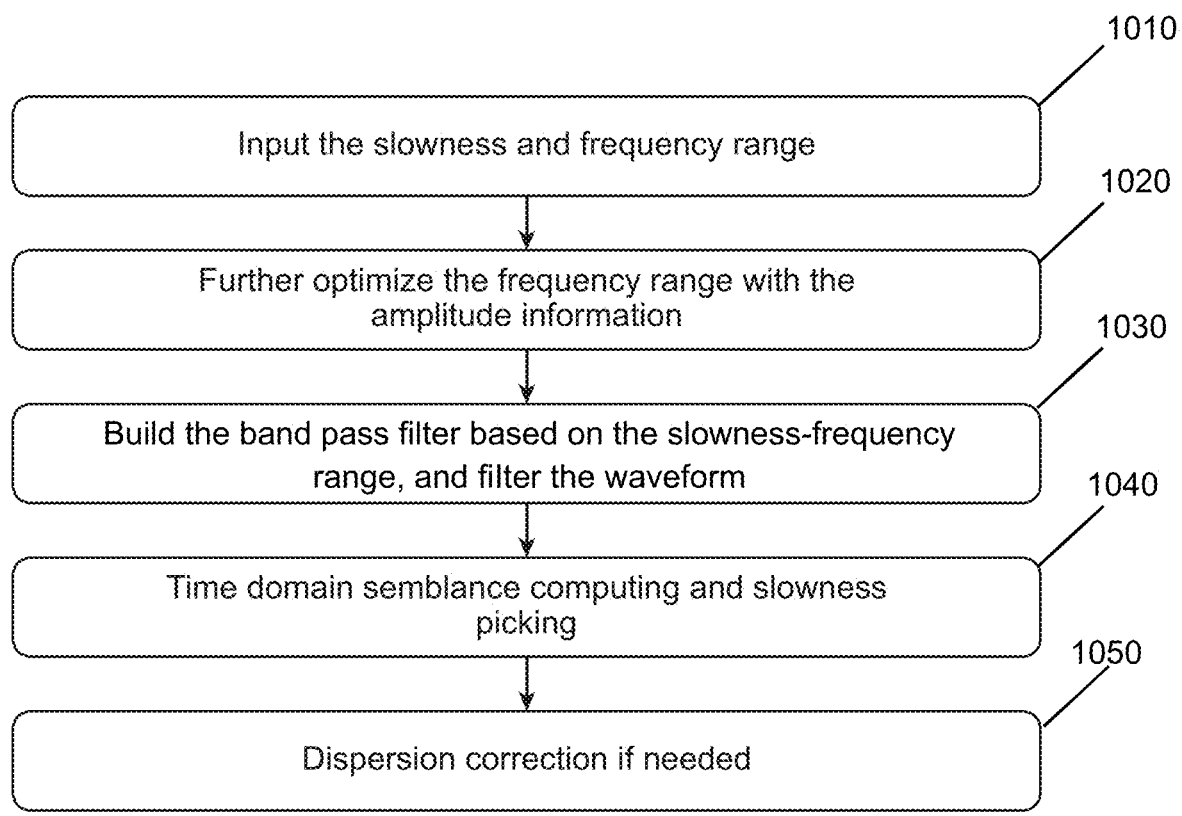
FIG. 10 illustrates an exemplary process workflow for incorporation of the frequency range determination with time-domain based methods.

The present disclosure also contemplates the application of the determined slowness-frequency range results to a time-domain based processing/inversion method. For example, FIG. 10 shows a workflow 1000 of applying the frequency range to a time-domain method. The process described in FIG. 10 is substantially similar to the process in FIG. 7, but involves a time-domain rather than a frequency domain. As a result, it can be seen in the workflow 1000 of FIG. 10 that rather than directly applying the slowness-frequency range for selecting data, an appropriate filter is applied to the time domain waveforms. This filter can work in the frequency-wavenumber domain as an f-k filter, or as a simple frequency filter. Accordingly, step 1010 involves applying the slowness-frequency range results to a time-domain to select a particular subset of the sonic data. At step 1020, the frequency range is further optimized based on the amplitude information associated with the target waveforms. At step 1030, a filter is built based on the slowness-frequency range, and the filter is applied to the waveform. From here, at step 1040, the selected subset of the sonic data may be subject to processing. This may include for instance a shear slowness picking from inside the selected domain range. Finally, at step 1050, a dispersion may be applied to correct the procedure if it is required by the selected algorithm.

Figure 11:
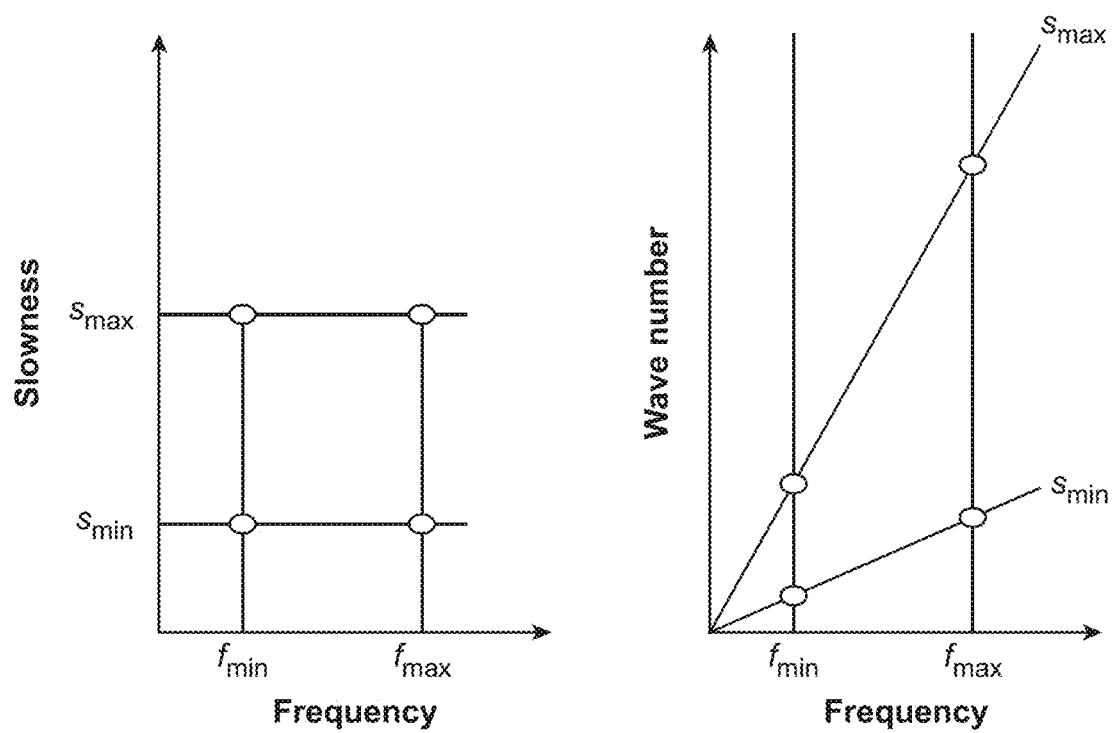
FIG. 11 is a graphical representation of conversion of the slowness-frequency range into the frequency-wavenumber domain.

FIG. 11 illustrates an example of converting from the slowness-frequency into the frequency-wave number domain. In general, as illustrated by FIG. 11, the range is controlled in a rectangular fashion in the slowness-frequency domain, and in a quadrangle fashion in the frequency-wavenumber domain. The four vertexes associated with the quadrangle in the frequency-wavenumber domain are defined by equation (9) below:

$$\begin{cases} (f_{min}, 2\pi s_{min} f_{min}) \\ (f_{min}, 2\pi s_{max} f_{min}) \\ (f_{max}, 2\pi s_{min} f_{max}) \\ (f_{max}, 2\pi s_{max} f_{max}) \end{cases} \quad (9)$$

Figure 12:
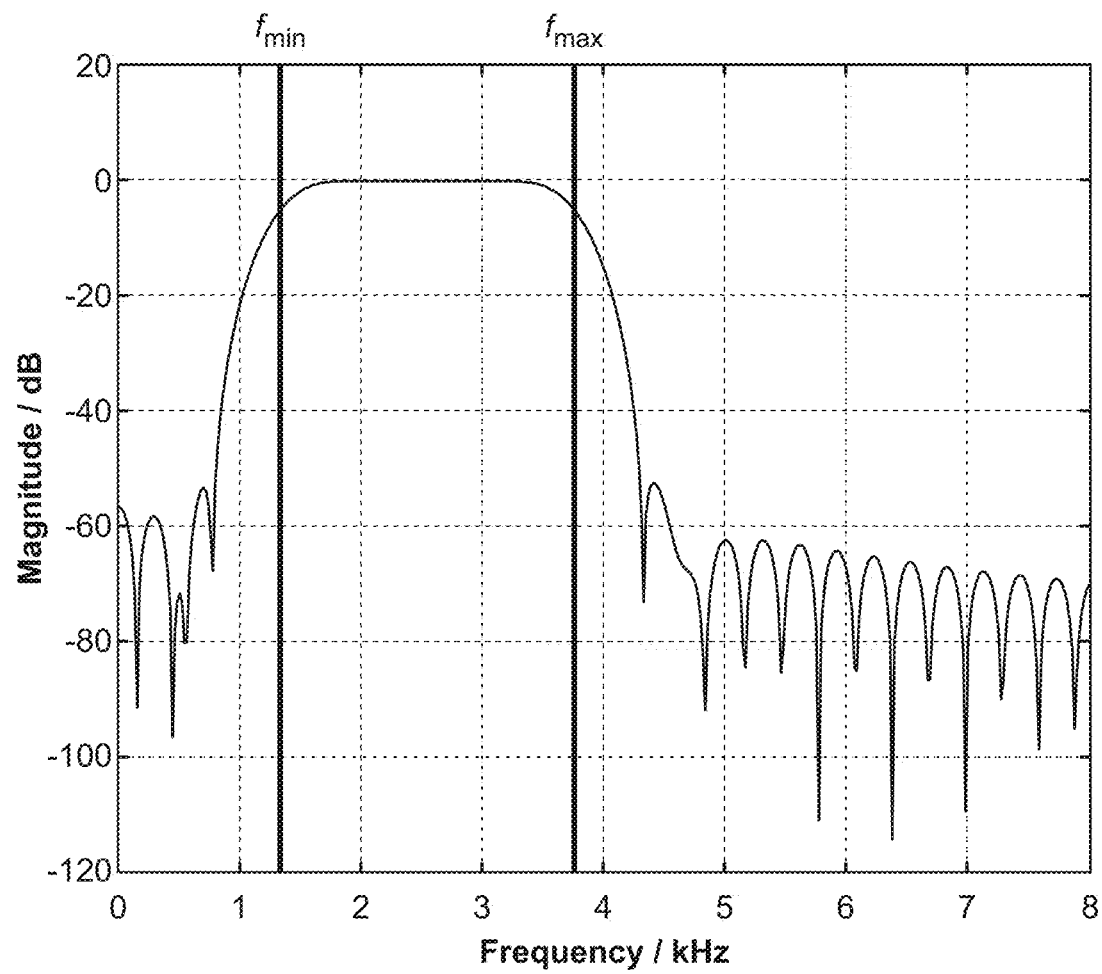
FIG. 12 is a graphical representation of a frequency filter response based on parameters selected in the example shown in FIG. 6.

It is possible to build a filter, such as an f-k filter, to enhance the inside of the quadrangle. For example, a filter that sets the values inside the quadrangle to be 1 and the values outside to be 0 can be generated. In most processing/inversion cases, a simple frequency filter will suffice. The frequency filter could be generated using any methods known in the art based on the values of the $f_{min}$ and $f_{max}$. For example, a FIR filter can be constructed with $f_{min}$ and $f_{max}$ as shown in FIG. 12. It can be seen that the frequency amplitude response of the filter, derived from the data in FIG. 6, suppresses the data outside of the desired frequency range.

Embodiments within the scope of the present disclosure may also include tangible and/or non-transitory computer-readable storage devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Statements of the Disclosure Include:

Statement 1: A method including: measuring, by a sonic logging tool, sonic data within a borehole; determining a frequency range for a selected mode of the sonic data; determining a slowness range for the selected mode of the sonic data; applying the frequency range and the slowness range to the sonic data to select a subset of data from the sonic data; and processing the selected subset of data.

Statement 2: The method according to Statement 1, further including: optimizing at least one of the frequency range and the slowness range based on amplitude information in the sonic data.

Statement 3: The method according to any one of Statements 1-2, wherein determining the frequency range including: executing a forward model to obtain a dispersion response from the selected mode; selecting a minimum frequency and a maximum frequency based on the dispersion response; generating a fitting function based on the minimum frequency and the maximum frequency; optimizing the fitting function; and determining, based on the optimized fitting function, the frequency range.

Statement 4: The method according to any one of Statements 1-3, wherein the forward model is executed based on a compressional slowness value obtained from the sonic data.

Statement 5: The method according to any one of Statements 1-4, wherein the selected mode is a flexural mode, and wherein processing comprises applying a shear slowness picking.

Statement 6: The method according to any one of Statements 1-5, wherein the frequency range and the slowness range are applied in the frequency domain.

Statement 7: The method according to any one of Statements 1-6, further including: applying a dispersion to correct the processed subset of data.

Statement 8: The method according to any one of Statements 1-7, wherein the frequency range and the slowness range are applied in the time domain.

Statement 9: The method according to any one of Statements 1-8, further including applying a filter to the subset of sonic data, the filter based on the frequency range.

Statement 10: The system including a sonic logging tool having a receiver array configured to receive a plurality of waveforms; one or more processors in communication with the sonic logging tool; and at least one computer-readable storage medium having stored therein instructions which, when executed by the one or more processors, cause the one or more processors to: measure, by a sonic logging tool, sonic data within a borehole; determine a frequency range for a selected mode of the sonic data; determine a slowness range for the selected mode of the sonic data; apply the frequency range and the slowness range to the sonic data to select a subset of data from the sonic data; and process the selected subset of data.

Statement 11: The system according to Statement 10, wherein the at least one computer-readable storage medium storing additional instructions which, when executed by the one or more processors, cause the one or more processors to: optimize at least one of the frequency range and the slowness range based on amplitude information in the sonic data.

Statement 12: The system according to any one of Statements 10-11, wherein determining the frequency range includes: the at least one computer-readable storage medium storing additional instructions which, when executed by the one or more processors, cause the one or more processors to: execute a forward model to obtain a dispersion response from the selected mode; select a minimum frequency and a maximum frequency based on the dispersion response; generate a fitting function based on the minimum frequency and the maximum frequency; optimize the fitting function; and determine, based on the optimized fitting function, the frequency range.

Statement 13: The system according to any one of Statements 10-12, wherein the forward model is executed based on a compressional slowness value obtained from the sonic data.

Statement 14: The system according to any one of Statements 10-13, wherein the selected mode is a flexural mode, and wherein processing comprises applying a shear slowness picking.

Statement 15: The system according to any one of Statements 10-14, wherein the frequency range and the slowness range are applied in the frequency domain.

Statement 16: The system according to any one of Statements 10-15, wherein the at least one computer-readable storage medium storing additional instructions which, when executed by the one or more processors, cause the one or more processors to: apply a dispersion to correct the processed subset of data.

Statement 17: The system according to any one of Statements 10-16, wherein the frequency range and the slowness range are applied in the time domain.

Statement 18: The system according to any one of Statements 10-17, further including apply a filter to the subset of sonic data, the filter based on the frequency range.

Statement 19: The transitory computer-readable storage medium including: instructions stored on the non-transitory computer-readable storage medium, the instructions, when executed by at least one processor, cause the at least one processor to: measure, by a sonic logging tool having a receiver array, sonic data within a borehole; determine a frequency range for a selected mode of the sonic data; determine a slowness range for the selected mode of the sonic data; apply the frequency range and the slowness range to the sonic data to select a subset of data from the sonic data; and process the selected subset of data.

Statement 20: The transitory computer-readable storage medium according to Statement 19, wherein determining the frequency range comprises, the non-transitory computer-readable storage medium storing additional instructions which, when executed by the one or more processors, cause the one or more processors to: execute a forward model to obtain a dispersion response from the selected mode; select a minimum frequency and a maximum frequency based on the dispersion response; generate a fitting function based on the minimum frequency and the maximum frequency; optimize the fitting function; and determine, based on the optimized fitting function, the frequency range.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

We claim:
1. A method comprising:
   measuring, by a sonic logging tool, sonic data within a borehole;
   determining a frequency range for a selected mode of the sonic data, wherein the determining of the frequency range comprises:
   executing a forward model to obtain a dispersion response from the selected mode, the forward model being executed based on a compressional slowness value obtained from the sonic data; and
selecting a minimum frequency and a maximum frequency based on the dispersion response, the dispersion response being based on flexural waves of a type of formation;
adjusting the maximum frequency of the frequency range to an updated maximum frequency to provide an updated frequency range, the updated maximum frequency being a center frequency of the frequency range;
determining a slowness range for the selected mode of the sonic data;
applying the updated frequency range and the slowness range to the sonic data to select an updated subset of data from the sonic data; and
adjusting the dispersion response based on the updated subset of data from the sonic data relating to the updated frequency range.

2. The method of claim 1, wherein determining the frequency range comprises:
generating a fitting function based on the minimum frequency and the maximum frequency;
optimizing the fitting function; and
determining, based on the optimized fitting function, the frequency range.

3. The method of claim 1, wherein the selected mode is a flexural mode, and further comprising applying a shear slowness picking.

4. The method of claim 1, wherein the frequency range and the slowness range are applied in the frequency domain.

5. The method of claim 4, further comprising:
applying a dispersion to correct processed subset of data.

6. The method of claim 1, wherein the frequency range and the slowness range are applied in the time domain.

7. The method of claim 6, further comprising:
applying a filter to the updated subset of data from the sonic data, the filter based on the frequency range.

8. The method of claim 1, further comprising optimizing the frequency range for the selected mode based on amplitude information of the sonic data, the amplitude information being based on array waveform data of the sonic data.

9. The method of claim 1, further comprising processing the selected updated subset of data from the sonic data.

10. A system comprising:
a sonic logging tool having a receiver array configured to receive a plurality of waveforms;
one or more processors in communication with the sonic logging tool; and
at least one computer-readable storage medium having stored therein instructions which, when executed by the one or more processors, cause the one or more processors to:
measure, by the sonic logging tool, sonic data within a borehole;
determine a frequency range for a selected mode of the sonic data, wherein the determination of the frequency range comprises:
executing a forward model to obtain a dispersion response from the selected mode, the forward model being executed based on a compressional slowness value obtained from the sonic data; and
selecting a minimum frequency and a maximum frequency based on the dispersion response, the dispersion response being based on flexural waves of a type of formation;
adjust the maximum frequency of the frequency range to an updated maximum frequency to provide an updated frequency range, the updated maximum frequency being a center frequency of the frequency range;
determine a slowness range for the selected mode of the sonic data;
apply the updated frequency range and the slowness range to the sonic data to select an updated subset of data from the sonic data; and
adjust the dispersion response based on the updated subset of data from the sonic data relating to the updated frequency range.

11. The system of claim 10, wherein determining the frequency range comprises:
the at least one computer-readable storage medium storing additional instructions which, when executed by the one or more processors, cause the one or more processors to:
generate a fitting function based on the minimum frequency and the maximum frequency;
optimize the fitting function; and
determine, based on the optimized fitting function, the frequency range.

12. The system of claim 10, wherein the selected mode is a flexural mode, and wherein the at least one computer-readable storage medium storing additional instructions which, when executed by the one or more processors, cause the one or more processors to apply a shear slowness picking.

13. The system of claim 10, wherein the frequency range and the slowness range are applied in the frequency domain.

14. The system of claim 13, the at least one computer-readable storage medium storing additional instructions which, when executed by the one or more processors, cause the one or more processors to:
apply a dispersion to correct processed subset of data.

15. The system of claim 10, wherein the frequency range and the slowness range are applied in the time domain.

16. The system of claim 15, the at least one computer-readable storage medium storing additional instructions which, when executed by the one or more processors, cause the one or more processors to:
apply a filter to the updated subset of data from the sonic data, the filter based on the frequency range.

17. The system of claim 10, the at least one computer-readable storage medium storing additional instructions which, when executed by the one or more processors, cause the one or more processors to:
optimize the frequency range for the selected mode based on amplitude information of the sonic data, the amplitude information being based on array waveform data of the sonic data.

18. The system of claim 10, the at least one computer-readable storage medium storing additional instructions which, when executed by the one or more processors, cause the one or more processors to:
process the updated subset of data from the sonic data.

19. A non-transitory computer-readable storage medium comprising:
instructions stored on the non-transitory computer-readable storage medium, the instructions, when executed by at least one processor, cause the at least one processor to:
measure, by a sonic logging tool having a receiver array, sonic data within a borehole;

determine a frequency range for a selected mode of the sonic data, wherein the determination of the frequency range comprises:
  executing a forward model to obtain a dispersion response from the selected mode, the forward model being executed based on a compressional slowness value obtained from the sonic data; and
  selecting a minimum frequency and a maximum frequency based on the dispersion response, the dispersion response being based on flexural waves of a type of formation;
adjust the maximum frequency of the frequency range to an updated maximum frequency to provide an updated frequency range, the updated maximum frequency being a center frequency of the frequency range;
determine a slowness range for the selected mode of the sonic data;
apply the updated frequency range and the slowness range to the sonic data to select an updated subset of data from the sonic data; and
adjust the dispersion response based on the updated subset of data from the sonic data relating to the updated frequency range.

20. The non-transitory computer-readable storage medium of claim 19, wherein determining the frequency range comprises,
  the non-transitory computer-readable storage medium storing additional instructions which, when executed by the at least one processor, cause the at least one processor to:
    generate a fitting function based on the minimum frequency and the maximum frequency;
    optimize the fitting function; and
    determine, based on the optimized fitting function, the frequency range.

* * * * *